US006240450B1

(12) United States Patent
Sharples et al.

(10) Patent No.: US 6,240,450 B1
(45) Date of Patent: May 29, 2001

(54) NETWORK DATA VISUALIZATION SYSTEM AND METHOD FOR DOWNLOADING VISUALIZATION SOFTWARE TO A USER STATION AFTER USER AUTHENTICATION

(75) Inventors: Peter A. Sharples, Woodbridge; Marco J. Fauth, Ipswich, both of (GB)

(73) Assignee: British Telecommunications public limited company, London (GB)

( * ) Notice: Subject to any disclaimer, the term of this patent is extended or adjusted under 35 U.S.C. 154(b) by 0 days.

(21) Appl. No.: 08/898,284

(22) Filed: Jul. 22, 1997

Related U.S. Application Data

(63) Continuation of application No. PCT/GB96/02528, filed on Oct. 16, 1996, which is a continuation-in-part of application No. 08/622,346, filed on Mar. 25, 1996, now abandoned.

(30) Foreign Application Priority Data

Oct. 16, 1995 (EP) .................................. 95307335

(51) Int. Cl.[7] .......................... G06F 15/173; G06F 15/16; H04M 3/22; H04L 12/26
(52) U.S. Cl. ........................... 709/224; 709/229; 379/32; 370/241
(58) Field of Search .................................. 709/223–225, 709/229, 246, 250; 713/201; 714/47; 379/9, 32–33; 370/241

(56) References Cited

U.S. PATENT DOCUMENTS

| 4,464,543 |   | 8/1984  | Kline et al.  |         |
|-----------|---|---------|---------------|---------|
| 4,788,718 |   | 11/1988 | McNabb et al. |         |
| 5,063,523 | * | 11/1991 | Vrenjak       | 709/223 |
| 5,249,181 |   | 9/1993  | Wang et al.   |         |
| 5,295,244 | * | 3/1994  | Dev et al.    | 345/357 |

(List continued on next page.)

FOREIGN PATENT DOCUMENTS

97/15007 * 4/1997 (WO) .

OTHER PUBLICATIONS

Couloris, G., et al., "Distributed Systems: Concepts and Design," Addison–Wesley, pp. 478–480, 484–485, 1994.*

Kochevar, P., et al., "Bridging the Gap Between Visualization and Data Management: A Simple Visualization Management System," Proc. Of Visualization '93, IEEE, pp. 94–101, Oct. 1993.*

Wielding, H., "Hot–Java—Ein WWW–Browser fur nachladbare Objekte", Objektspectrum, XP002003462, No. 5, pp. 68–69, Oct. 1995.*

Moralee, D., "Scientific Graphics and Visualization Come to the Internet," Scientific Computing World, No. 6, pp. 31, 33–34, 36, Mar. 1995.*

(List continued on next page.)

*Primary Examiner*—Zarni Maung
*Assistant Examiner*—Andrew Caldwell
(74) *Attorney, Agent, or Firm*—Nixon & Vanderhye P.C.

(57) ABSTRACT

A network data visualization system and method are disclosed. In a specific embodiment, a user accesses a web page using a browser. Before returning the web page, the server authenticates the user by returning an authorization page that prompts the user for a password. If the user enters a valid password, the server returns a web page containing data visualization software in the form of one or more applets. The data visualization software running on the user station retrieves network data from a database, processes the retrieved network data for visualization, and displays the network data to the user. The network data may include telephone call records, traffic data, or traffic management statistics. The displayed information may be arranged temporally or spatially. The displayed information may be limited to that of one or more specific telephone numbers. The data visualization software allows the user to monitor events almost in realtime.

27 Claims, 4 Drawing Sheets

U.S. PATENT DOCUMENTS

| | | |
|---|---|---|
| 5,347,632 | 9/1994 | Filepp et al. . |
| 5,410,586 | 4/1995 | Davies . |
| 5,461,667 | 10/1995 | Remillard . |
| 5,491,820 | 2/1996 | Belove et al. . |
| 5,497,463 | 3/1996 | Stein et al. . |
| 5,500,929 | 3/1996 | Dickinson . |
| 5,506,894 | 4/1996 | Billings et al. . |
| 5,530,852 | 6/1996 | Meske et al. . |
| 5,544,302 | 8/1996 | Nguyen . |
| 5,671,408 * | 9/1997 | McBride .............................. 707/100 |
| 5,684,988 * | 11/1997 | Pitchaikani et al. ................. 707/104 |
| 5,774,669 * | 6/1998 | George et al. ....................... 709/224 |
| 5,861,885 * | 1/1999 | Strasnick et al. .................... 345/355 |
| 6,023,280 * | 2/2000 | Becker et al. ....................... 345/440 |
| 6,115,040 * | 9/2000 | Bladow et al. ...................... 345/335 |
| 6,138,130 * | 10/2000 | Adler et al. ......................... 707/503 |
| 6,138,150 * | 10/2000 | Nichols et al. ...................... 709/219 |
| 6,154,212 * | 11/2000 | Eick et al. ........................... 345/356 |
| 6,161,128 * | 12/2000 | Smyk ................................... 709/205 |
| 6,169,992 * | 1/2001 | Beall et al. .......................... 707/103 |
| 6,170,015 * | 1/2001 | Lavian ................................. 709/232 |

OTHER PUBLICATIONS

Boston, A., et al., "Interactive Species Distribution Reporting, Mapping and Modelling Using the World Wide Web," Computer Networks & ISDN Systems, vol. 28, No. 12, pp. 231–238, Dec. 1995.*

Crutcher, L., et al., "Management and Control for Giant Gigabit Networks," IEEE Network, vol. 7, No. 6, pp. 62–71, Nov. 1993.*

Tanenbaum, A., "Computer Networks," 2nd ed., Prentice–Hall, p. 473, 1989.*

* cited by examiner

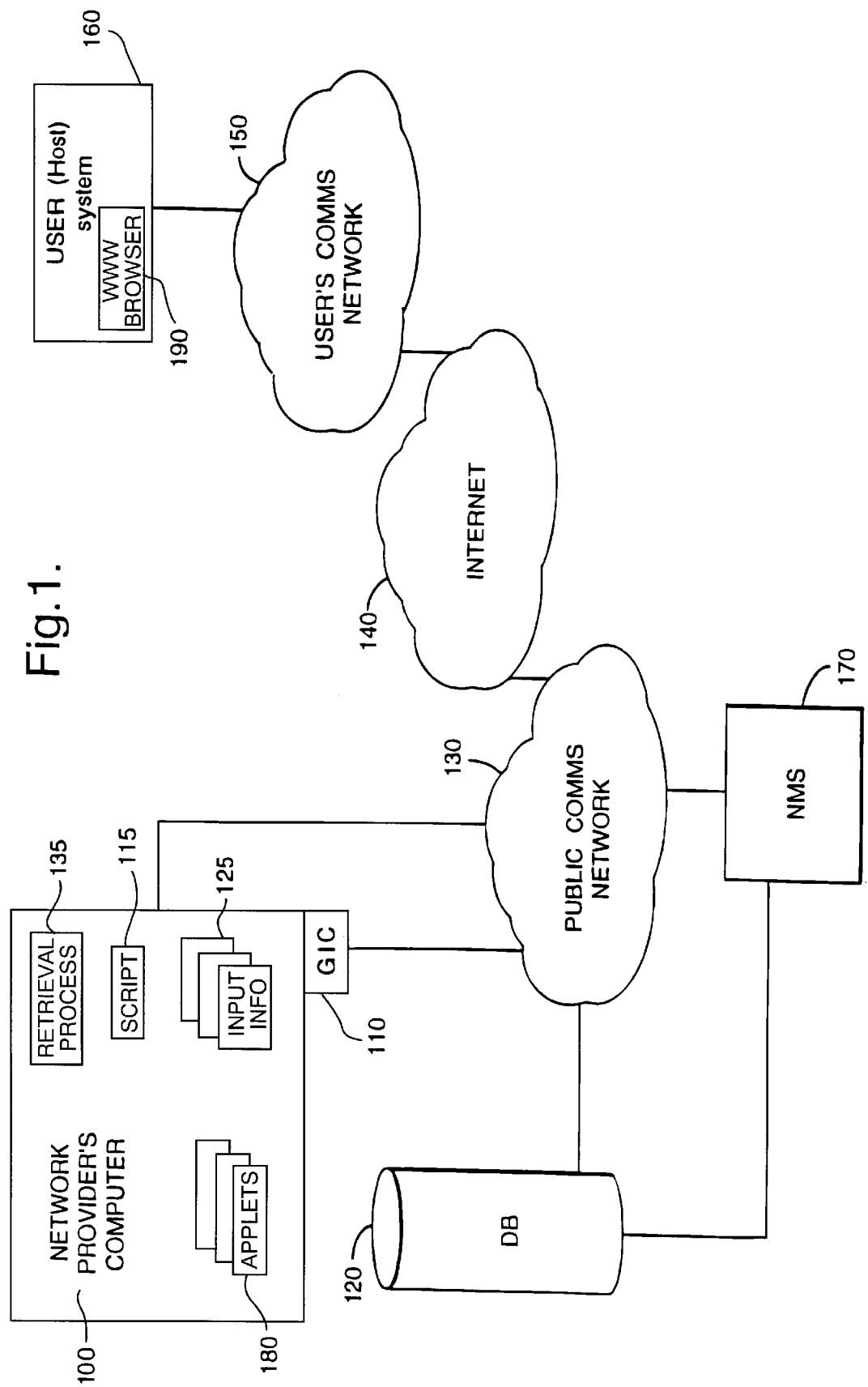

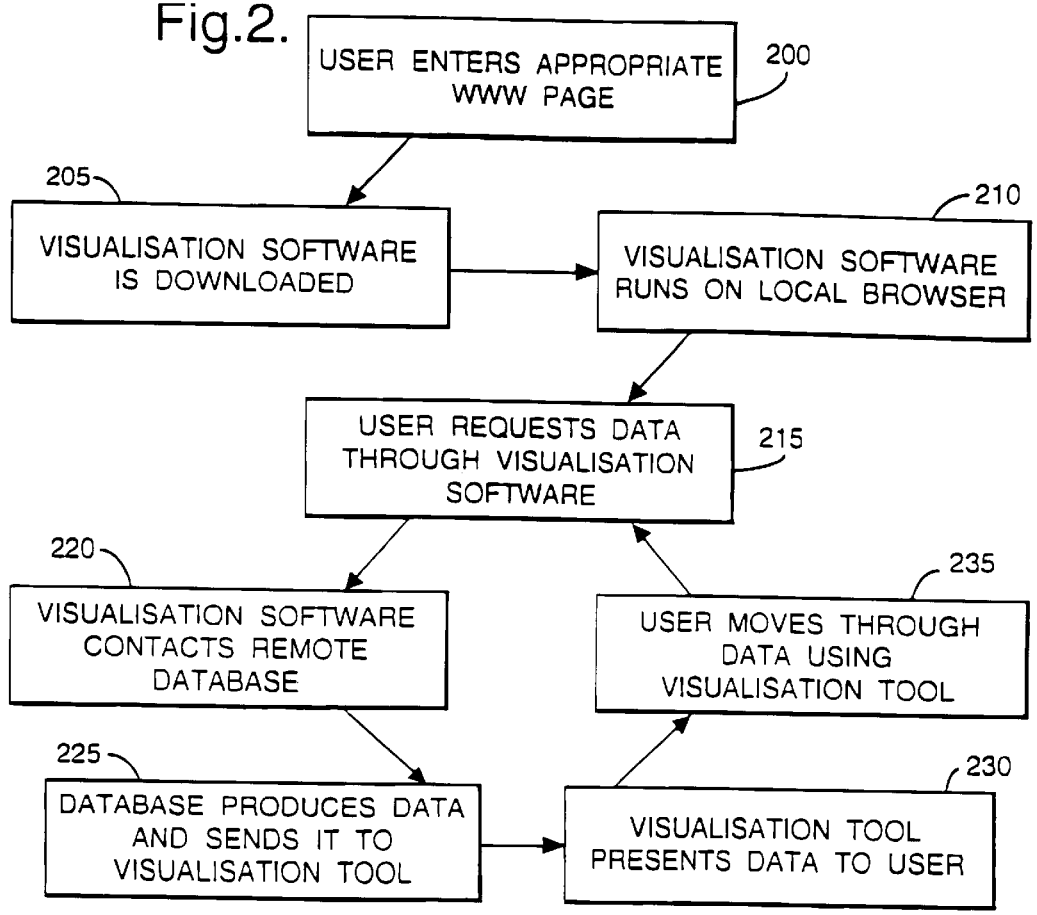
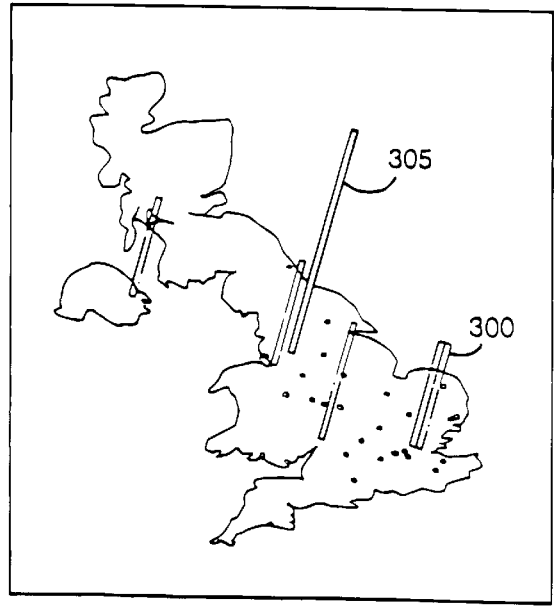

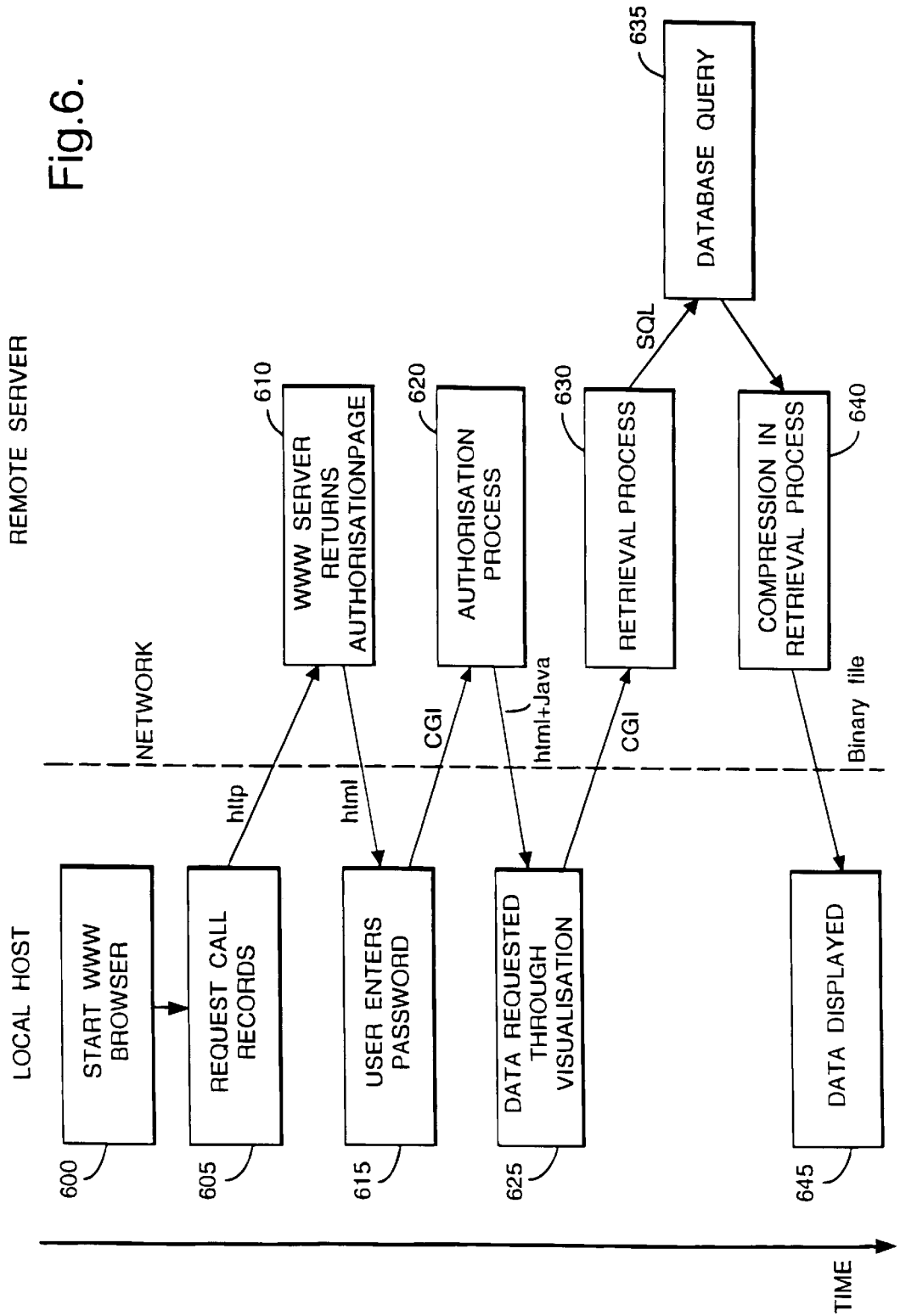

NETWORK DATA VISUALIZATION SYSTEM AND METHOD FOR DOWNLOADING VISUALIZATION SOFTWARE TO A USER STATION AFTER USER AUTHENTICATION

CROSS-REFERENCE TO RELATED APPLICATION

This application is a continuation under 35 USC §120 (365) of copending PCT/GB96/02528 designating the U.S. and filed Oct. 16, 1996 as, in turn, a continuation-in-part (under 35 USC §120/365) of U.S. application Ser. No. 08/622,346 filed Mar. 25, 1996, now abandoned.

BACKGROUND OF THE INVENTION

1. Field of the Invention

The present invention relates to a system and/or process for remote access to data and visualisation thereof. It finds particular application in data monitoring.

2. Related Art

Data visualisation techniques are known and clearly useful. There are many scenarios in which a user may have complex and extensive data available to them. The ability to present large data sets in a graphical form which allows a user to gain more understanding of the original data has been the focus of the emerging subject of scientific visualisation for the past few years. In a typical visualisation application, data is represented in the form of a three dimensional graphical object on a computer display screen. The shape and colouring of the object are dictated by the data set from which it was derived. The user has the ability to move and turn the object on the screen and adjust the lighting angles to highlight features in the data set. The use of animation, where the form of the object varies in time according to changes in the base data, is also a valuable mechanism in communicating trends in the data set.

Visualisation is used for instance within the scientific and academic communities to examine the results of simulations and experiments. The data is generally stored locally to the computer on which the visualisation is to be performed and each set of data is approached with the user writing software to produce a different visualisation. Thus visualisation is a mechanism of data access used by technical users who understand the nature of, and access methods for, their data. It has now been realised, in making the present invention, that it is possible and advantageous to find a way to give remote access to data, together with visualisation capability, to non-technical users.

SUMMARY OF THE INVENTION

According to the present invention, there is provided a remote access data visualisation system comprising:

i) a communications network;
ii) access means for use in accessing a database;
iii) means for receiving a user request in relation to visualisation of data stored in the database; and
iv) at least one data visualisation software tool for visualising data from the database, the tool being stored, when not in use by a user, so as to be downloadable to a user location, wherein the system is adapted to respond to a received user request in relation to data visualisation by downloading:
a) the data visualisation software tool; and
b) location information for data for use by the tool in visualisation, to the user location.

The user location can be remote with respect to either or both of the database and the storage location for the software tool.

It will be understood that the network may in practice comprise more than one type of network. For instance, the network may in practice be provided by a local area network connected to a public switched telecommunications network and/or to the Internet.

Preferably, the system further comprises means for loading and updating data in the database in a form which can be queried by the data visualisation software tool when downloaded to the user location. This allows a system operator also to provide the relevant data for the user to visualise.

By providing a suitable data visualisation means, such a system can enable a non-technical user, at a remote location with respect to a database, to access a complex data set and to control the manner of presentation so that the data is presented in a graphic and understandable way. This brings data visualisation techniques to a far greater range of users. For instance, data visualisation could, according to embodiments of the present invention, provide significant benefits to commercial fields, particularly the financial and telecommunications industries, where large quantities of data are routinely collected on computerised monitoring systems. Allowing a wider range of people within an organisation, with widely differing technical capabilities, to examine this data could for instance provide a valuable insight into the effectiveness of a particular operation. Alternatively, an organisation might want to provide better information to their customers.

A problem solved by embodiments of the present invention is moving the field of data access and visualisation from the province of the technical expert situated close to the data source to the area of access by a geographically diverse set of users with varying levels of experience and different types of equipment.

In a particularly useful and advantageous embodiment, the data to be accessed may comprise traffic data for a communications network. A user who has an interest in traffic on that network may then be able to download and visualise the data in an extremely useful way. For instance, if the user is a service or information provider, it would be possible for the user to get extremely early feedback on the response to a new or modified service, or to an advertising campaign, in a way which has not previously been available. The data visualisation software tool will of course in these cases generally be a tool for visualising communications traffic and may provide for instance a bar chart format and/or geographical indicators.

Preferably, the means for receiving a user request comprises authentification means for authenticating a received request as being made by an authorised user. This means that the database could contain confidential information.

As mentioned above, the user request may carry an identifier for data to be selected from the database, in which case the authentication means may authenticate the request specifically in relation to the data to be selected. A system of this type would have particular relevance where the data comprises communications traffic statistics in a network and the identifier may comprise one or more telephone numbers in which the user may have an interest. For instance, this may be because the user is a service provider, using said one or more telephone numbers in provision of the service. Preferably, the system then further comprises means to read the identifier and to download, together or in association with the data visualisation software tool, one or more addresses for location of the data to be selected.

Effectively, it becomes possible to provide a practicable system of remote access data visualisation. The system of providing a data access method to a remote computer where the data presentation and access software are retrieved by the user automatically at the time of data access is a new technique in data distribution. If the data relates to traffic statistics in a communications network, then this is a particularly useful system for the service provider who can monitor almost in real time the success or otherwise of a particular communications service.

Another use of an embodiment of the invention might be to access data relating to financial transactions. In this case, an identifier for relevant data might comprise one or more account numbers, or a banking office address.

BRIEF DESCRIPTION OF THE DRAWINGS

A data access and visualisation system according to an embodiment of the present invention will now be described, by way of example only, with reference to the following FIGS. in which:

FIG. 1 shows in schematic form components of the data access and visualisation system;

FIG. 2 shows a flow diagram of the process steps involved at high level in accessing and visualising data using the system of FIG. 1;

FIG. 3 shows a graphical display which might be accessed by a user in use of the system;

FIG. 6 shows a flow diagram of the process steps of FIG. 2 represented at a more functional level.

DETAILED DESCRIPTION OF EXEMPLARY EMBODIMENTS

Figure 4:
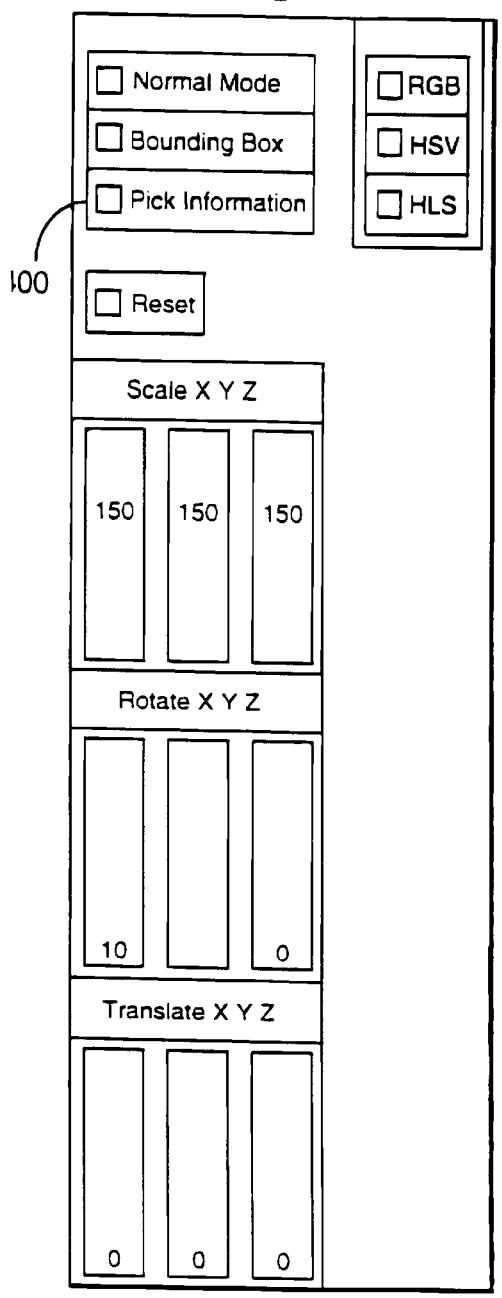
FIG. 4 shows a display control window by means of which a graphical display according to FIG. 3 might be controlled by a user in use of the system.

A major problem in moving to geographically diverse data access is the method of delivery. To be of practical use the system should preferably be capable of allowing immediate access to data which is continually being produced. Different methods of data visualisation are appropriate to different data types and so require different software in which to produce them. Although it would be possible for each user to procure and load the necessary software onto their local machines prior to receiving the data, this would involve delay and require a certain level of technical competence on the part of the user.

Referring to FIG. 1, the data access and visualisation system provides data to a user's personal computer (PC) 160 by means of one or more (in this case three) communications networks 130,140,150. That is, the user's PC 160 is connected via their own Local Area Network (LAN) 150 in known manner to a data network with high inter-connectivity between different sites, for instance an "information superhighway" such as the Internet 140. In turn, the Internet is connected to a public network 130 with which the target database 120 is associated.

The target database 120 in the general case may belong to the user, albeit in a different location or locations from their PC, or it may for instance be that of an independent service or information provider. In the embodiment described below, the database 120 is that of the public network provider and receives network management information from the public network 130 in the normal running of the network 130, including performance and traffic data. Hence the database 120 is connected to a network management system 170 which processes (in known manner) management information from the network 130. It is also connected to the public network 130 for remote access to the management data.

The public network 130 itself provides the link from the Internet 140 to the network provider's computing system 100. Access for the user to the remote computing system 100 is via a Common Gateway Interface (CGI) 110. (The CGI is a known protocol and is simply shown in FIG. 1 as a functional block.)

The user's PC 160 is provided in known manner with a World Wide Web (WWW) browser 190 for locating and accessing information via the Internet 140. A WWW browser 190 is not essential but is used in order to obviate the need to supply different software for users' differing computers. Several of these are currently available for accessing information from sites on the Internet 140 including Mosaic and Netscape (Trade Marks). However, in order to realise an embodiment of the present invention, a browser having capabilities equivalent to those of "HotJava" (Trade Mark) developed by SUN Microsystems is required. That is, the browser should be able to retrieve not only text and images from the Internet 140, but also sections of executable code that can run on the user's own machine. If a HotJava browser is used, the code can run securely, within HotJava on the user's machine.

These sections of code are referred to as "applets" 180 and are written in the java programming language. In the embodiment of the invention described, the applets 180 will be stored on the network provider's computer system 100. They are only retrieved when it is necessary and are loaded automatically by the browser 190, as described below. There is no need for the user to identify and load the relevant software locally. Details of HotJava can be found from WWW at http://java.sun.com.

Overall, the process for implementing the remote data access and visualisation technique covered in this patent application takes the following form. A user accesses a relevant page on the Internet, dedicated to the visualisation process, by using their WWW browser 190. The software to provide the appropriate visualisation tool is then downloaded from the remote computer 100 into the browser running on the user's own computer 160.

The exact form of the graphical user interface can vary depending on the type of data being accessed but it will always contain a mechanism for a user to select a specific set of data.

Referring to FIG. 2, the operation of the system can be described by the following process steps:

STEP 200: the user locates and enters a WWW page provided by the public network provider;

STEP 205: visualisation software is downloaded, again provided by the public network provider;

STEP 210: the visualisation software is run on the user's browser 190;

STEP 215: the visualisation software prompts the user to request data;

STEP 220: once the user has identified the data to be requested, the visualisation tool communicates with the network provider's computer 100, requesting the identified data from the remote database 120. This causes a process to run on the network provider's computer 100, querying the database 120;

STEP 225: the remote database 120 responds by sending the requested data to the network provider's computer 100 which packages it in a form that can be viewed by the user at any one time and sends it to the user's browser 190;

STEP 230: the visualisation software presents the data to the user;

STEP 235: the user moves through the data using the visualisation tool.

After STEP 235, the user can return to STEP 215 and repeat STEPS 220 to 235 in respect of freshly requested data. The intention is that the user will employ the visualisation tool to look through the data that has been requested. Once the user has gained all of the information required from a particular data set, they can request additional data from the remote machine 100 and the first data set can be discarded.

Example:
Telephone Traffic Data Visualisation

In a specific implementation of the data access method described above, the data a user requests relates to the number of telephone calls made over the public network 130 to a specific number, belonging to the user, from different regions of the country. The data available in the database 120 has already been processed by the network provider such that calls are grouped according to the trunk network exchange that they originate on and by the hour in which they were made.

Referring to FIG. 3, a basic graphical display might then comprise a set of towers 300, 305 extending in a three-dimensional representation from a map of the UK. The location of the towers 300, 305 shows the actual location of the trunk exchanges and the height and colour of each tower 300, 305 relate to the number of calls handled by the relevant exchange in a one hour period. (Such displays are of known type. Other display techniques could be substituted and will generally be optimised for the nature of the data involved.)

Referring to FIG. 1, the operation of the data access system is therefore as follows. The user enters the appropriate page on WWW, provided by the network provider, and is asked to enter the destination telephone number in which they are interested, in addition to their name and password. This will then run a script 115 via the Common Gateway Interface (CGI) 110 on a remote server of the network provider's computer system 100 to check the authority of the user to access the appropriate data. Assuming that the authorisation is given, the script will return an html (Hyper Text Mark-up Language) page to the originating browser into which is included a line specifying the applet 180 which must be loaded in order run the visualisation tool. Input information 125 to the applet 180 is also included on this line. In the case of a call record implementation this includes the location of a data file containing the outline map of the UK, a file giving the location of the towers 300, 305 and a file containing additional information about each tower that will display when a tower is selected. More information about this selection is given later. In addition the appropriate address for accessing the data from the remote server is presented. On receiving this html page, the HotJava browser will load the applet 180 from wherever it is stored, which will conveniently be from the remote server.

Once the applet 180 has successfully loaded into the browser 190 it will access the remote server to download the necessary map files. This is achieved using the standard remote file access features supplied with a release of HotJava available from http://java.sun.com. An initial display as shown in FIG. 3 is then drawn to the screen using the existing library functions available with HotJava. Depth cueing can be implemented in a call record visualisation exercise in order to give the user a visual guide to the orientation of the display.

Figure 5:
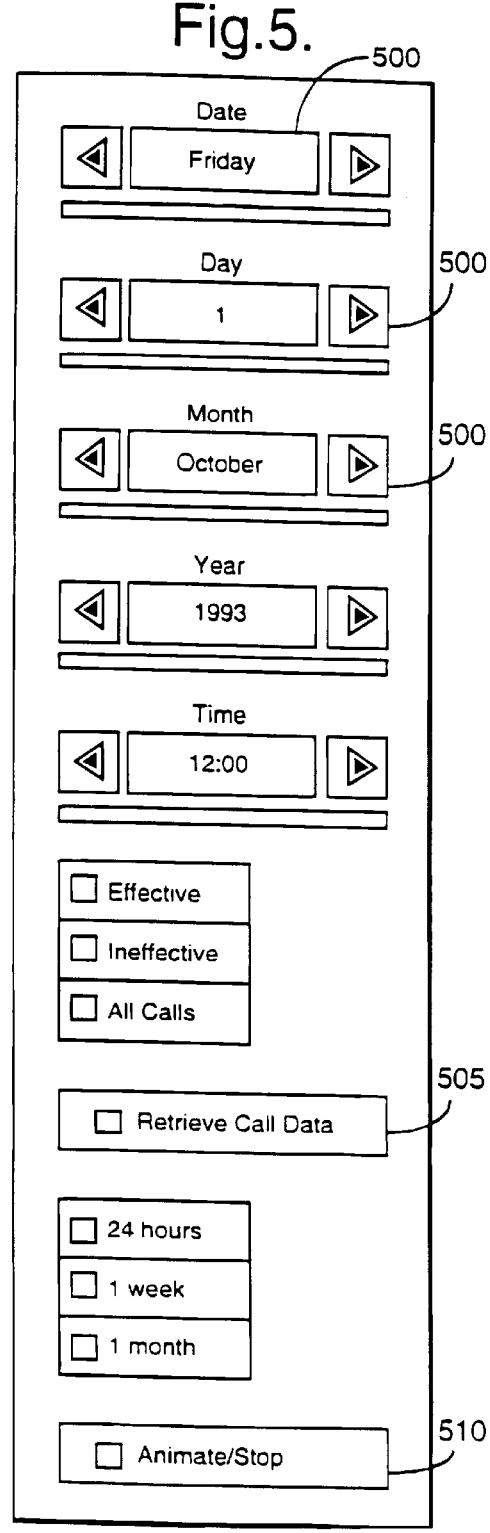
FIG. 5 shows a data selection window by means of which data being visualised in use of the system can be selected by a user.

Referring to FIGS. 4 and 5, in the call record implementation of the remote data access, the applet 180 causes three additional windows to be displayed on the screen. These are the display control window (FIG. 4), data selection window (FIG. 5) and pick data windows (not shown). These windows are only open for the period that the user is inside, on the data access page.

Display Control

A geometry package has been developed which can be used as a platform for other visualisation applets that require the user to be able to manipulate a graphical object on the screen. The available functions are:

rotation—this is achieved by either placing the mouse pointer over the graphical display and dragging the mouse with the mouse button depressed in the required direction of rotation or alternatively by adjusting the slider bars on the display control window shown in FIG. 4. All mouse control functions are provided in the HotJava applet library. The mechanism for rotating the object involves updating a transformation matrix and applying it to the original graphical data set as the mouse is dragged across the screen. Following each matrix transformation the screen is redrawn. This is a standard computer graphics technique. Due to the computation overhead required in rotating the whole image in real time another mode of rotation is available. In this case, on depressing the mouse button a box which fully bounds the graphical object is drawn on the screen in place of the full display. This contains far fewer components and so can be rotated far quicker than the full image. The two modes are selected using the mutually exclusive "Normal" and "Bounding Box" buttons on the display control screen. The bounding box technique is employed in other visualisation products, for example AVS.

scaling—the image can be made larger and smaller using the scaling slider bars on the display control window. The ability to scale the figure differently in three orthogonal planes is provided. Scaling is achieved via a transformation matrix in much the same way as rotation.

translation—the image can be moved around the screen using the translate slider bars on the display control window. Movement is divided into three orthogonal directions.

reset—this returns the display to a predefined orientation which is stored within the applet.

Data Selection

Referring to FIG. 5, the data selection window offers the user the ability to choose the appropriate data set. In the case of the call record implementation, this involves selecting the appropriate hour and day for which data is required. This is done via a set of widgets 500 in the data selection window that allow the user to select the appropriate day, month and year. The widget sets are available in the Java widget libraries.

In addition to setting the date and time, any subset of data can also be selected at this point. In the call record example, the calls are split into two categories, effective and ineffective. Thus the user can select whether or not to view the effective calls, ineffective calls or all calls (the sum of effective and ineffective).

Once the appropriate date and time has been selected, the user presses the "Retrieve Call Data" button 505. This initiates a query to a database 120 running on the remote server. In a call record implementation, it may be that the access time to retrieve data from the database 120 is considered to be unacceptable and a number of pre-prepared data files corresponding to individual hour slots can be produced. These can then be retrieved from the database 120 and a form of data compression carried out. That is, all extraneous white spaces and unwanted data can be removed from the resulting files to ensure the smallest possible file to increase the speed of transmission of the file from the server to the browser 190 across the Internet 140. In this case, depressing the "Retrieve Call Data" button 505 causes the browser 190 to request the file corresponding to the correct date and time from the remote server. This is achieved using the remote file access libraries supplied with HotJava.

In addition to retrieving data for a single period, the call record example can allow for the data representation to be animated. The user can select whether or not to animate over 24 hours, in which case the data is accessed one hour at a time from the server and displayed on the screen in a series of 24 frames. Alternatively the user can select to run over a week, in which case seven sets of data are retrieved corresponding to the selected hour on seven subsequent days. Selection of the one month option will result in a "calendar months" set of files being accessed for the selected hour and displayed on the screen in turn. At each point the animation can be started or halted by pressing the "Animate/Stop" button 510 on the data selection screen. This initiates or halts the loop which controls the remote data file access commands.

Data Picking

An additional feature available within the call record data access system is the ability to acquire additional data about individual towers. This data is contained in a file that is loaded shortly after the applet 180 and can be tailored to the requirements of individual users. Referring to FIG. 4, to enable the data picking facility, the "Pick Information" button 400 on the display control window should be depressed. This will freeze the image of the towers 305, 300 and map outline on the screen. The locations of the towers 305, 300 are converted, via the transformation matrix, from three dimensional to two dimensional space and a two dimensional map is created on which the extents of each form a polygon. Where one tower obscures the view of another a check is made on the three dimensional data to ensure that the two dimensional map attributes the front tower an area corresponding to its fullest extent and the obscured tower only has an area equivalent to its unobscured portion.

Now as the mouse pointer tracks across the display a check is made to see when the pointer enters a tower area on the two dimensional map. When this occurs the tower is redrawn in white and the information corresponding to that tower is displayed in text form in the pick data window. Further information about the specific location can be accessed by depressing the mouse button at this point. This causes the browser to access a different htmi page, the address of which is stored in the towers data file, and to shut down the additional windows that were opened by the java applet. (The ability to move to other html pages from within a java applet is provided in the java libraries.)

Data Exchanges

Referring to FIG. 6, this section describes the precise mechanisms in which data is accessed and passed around the data visualisation system.

Authorisation

On entering the welcoming WWW page (STEPS 600, 605) the user is required (STEP 610) to input the telephone number for which they require data and a password (STEP 615) associated with this number. This is implemented using the FORM , ACTION and METHOD tags specified in the html (Hypertext Markup Language). Following this action a process is initiated on the remote server, using the Common Gateway Interface (CGI), which will examine the password and telephone number combination to ensure that they correspond (STEP 620). If this is the case, the process will form a file in html, including the Java applet tag indicating the location of the visualisation application, which is returned to the browser at the local host. The WWW browser running at the local host accepts this as a new page and downloads and launches the data visualisation application.

Data Retrieval

The visualisation application allows the user to select the data to be retrieved via a graphical user interface (STEP 625). Once the user has requested a particular set of data another process, referred to hereafter as the retrieval process 135, is created on the remote server using CGI. The arguments passed to the retrieval process 135 identify the data that is required. It is the retrieval process (STEP 630), running on the remote server that forms a query using SQL (Standard Query Language) which is used to extract the necessary data from the Call Records Database (STEP 635). The Call Records Database could be one of a number of commercially available databases, for example ORACLE. The result of the query on the database is received by the retrieval process and compressed (STEP 640) to produce a binary file. The binary file is accessed by the local host using the standard libraries supplied with the Java language and unpacked to provide the data required by the visualisation software (STEP 645).

The commercial software required to provide this system includes a database containing the call records and a WWW server running on the remote server in addition to a Java compatible WWW browser running on the local host. The additional software developed to produce this system includes the visualisation application itself, written in Java, in addition to the authorisation and retrieval processes on the remote server. These could be written in any suitable language, including for instance "CT".

What is claimed is:

1. A remote data access system comprising:

a data store accessible by means of a data access network, and a data browser for locating data in the data store and downloading it over the network to a user station, wherein there is further provided data visualisation software for selecting and controlling presentation of the data, the data browser being adapted to download the data visualisation software over a network, and to run said software at the user station to select and control presentation of data downloaded from the data store; and wherein the data store comprises call records in respect of a communications network.

2. A system as in claim 1 wherein the communications network is a different network with respect to the data access network.

3. A system as in claim 1 wherein the data sets each carry the call records for a respective service provider making services available over the communications network.

4. A system as in claim 1 wherein said call records are updated at intervals of no more than twenty four hours such that the system is able to provide a near realtime view to the user station.

5. A system as in claim 1 wherein:

the communications network is provided with a billing system for outputting bills to users of the network, and the data store of the remote data access system comprises at least part of a call record store used to store and output call data to the billing system in respect of the communications network.

6. A data visualisation system for enabling remote access by a user to a database, the user having a user station equipped with a browser capable of downloading and running software, the data visualisation system comprising:

i) a computer system provided with one or more modules of software for use in visualising data, and provided with means responsive to a request from the user station to output or copy one or more of said modules of software to the user station; and ii) a database accessible by the user under the control of the computer system to output data to the user station, and comprising data stored in a form which can be queried by the one or more modules of software when downloaded together with the software to the user station;

the arrangement being such that data can be downloaded from the database to the user station, under control of the computer system in response to user inputs at the user station, the computer system also providing one or more of said modules of software to the user station, such that the user can visualise the data by means of said one or more modules at the user station;

wherein the data comprises communications traffic data.

7. A system as in claim 6 wherein the one or more modules of software comprise data visualisation software for visualising communications traffic in a communications network.

8. A system as in claim 7 wherein the spatial distribution of the traffic in the network can be visualised.

9. A system as in claim 7 wherein the temporal distribution of the traffic data can be visualised.

10. A system as in claim 7 wherein the data is arranged at least in part in data sets, each data set comprising traffic data accumulated over an interval of time.

11. A system as in claim 7 wherein data to be downloaded to the user station relates to a common destination number, or set of numbers, in a communications network.

12. A system as in claim 7 wherein the computer system also provides network management of a communications network and the data relates to traffic in that network.

13. A system as in claim 7 wherein the computer system comprises means for processing the data prior to downloading to the user station so as to reduce the transmission capacity required for said downloading.

14. A system as in claim 7 wherein the computer system is provided with means to authenticate a request by a user for data to be downloaded.

15. A method of providing data visualisation to a remote user, of data stored in a database in a form which can be queried by a data visualisation software tool, which method comprises:

storing the data visualisation software tool in a computer system, receiving a request to the computer system from a remote user for the tool, authenticating the request and outputting or copying the tool to the user, receiving a request from the user for data from the database by means of the tool, accessing the database, and providing the data to the user, wherein the data comprises communications traffic data in a network.

16. A method as in claim 15 wherein the network to which the data is relevant is used at least in part to transmit the data to the user station and the computer system provides network management of said network.

17. A remote access data visualisation system comprising:

i) a communications network;

ii) access means for use in accessing a database;

iii) means for receiving a user request in relation to visualisation of data stored in the database; and iv) a data visualisation software tool stored, when not in use by a user, in relation to the network so as to be downloadable over the network to a user location, wherein the system is adapted to respond to a received user request in relation to data visualisation by downloading;

a) the data visualisation tool; and b) location information for data for use by the tool in visualisation, to the user location;

wherein the database holds traffic management statistics in relation to a communications network and the means for receiving a user request comprises means for reading an identifier for one or more telephone numbers of the network, the or each data visualisation tool downloaded in response to a request thereafter being enabled only to visualise traffic data in relation to the telephone number(s) identified in that request.

18. A data visualisation system for enabling remote access by a user to a database, the user having a user station equipped with a browser capable of downloading and running software, the data visualisation system comprising:

i) a computer system provided with data visualisation software, data retrieval software, means responsive to one or more requests from the user station to output data visualisation software to the user station, and means to authenticate a request by a user in respect of data to be downloaded; and ii) a database accessible by the data retrieval software of said computer system for retrieval and output of data to the user station;

the data visualisation system being arranged such that:

iii) in response to a user input at the user station transmitted to the computer system data visualisation software is downloaded by the computer system to the user station; and iv) in response to an authenticated request by a user in respect of data to be downloaded at the user station, said request being transmitted to the computer system by the downloaded data visualisation software, said data can be selected and retrieved from the database by said data retrieval software and downloaded to said user station for visualisation by use of said downloaded data visualisation software;

wherein the data comprises communications traffic data and said data visualisation software comprises software for visualising communications traffic in a communications network.

19. A system as in claim 18 wherein the spatial distribution of the traffic in the network can be visualised.

20. A system as in claim 18 wherein the temporal distribution of the traffic data can be visualised.

21. A system as in claim 18 wherein said database comprises at least two storage locations, data being input by the communications network to a first of said locations and the computer system being further provided with data processing software for selecting and processing data from said first location and storing the selected and processed data at a second of said locations, said data retrieval software being connected for data retrieval from said second location.

22. A system as in claim 21 which further comprises means for updating data stored at said second location at a predetermined interval.

23. A system as in claim 21 wherein the selected and processed data comprises traffic data accumulated over one or more intervals of time.

24. A system as in claim 18 wherein the computer system also provides network management of a communications network and the data relates to traffic in that network.

25. A data visualisation system for enabling remote access by a user to a database, the user having a user station equipped with a browser capable of downloading and running software, the data visualisation system comprising:

i) a computer system provided with data visualisation software, data retrieval software, means responsive to one or more requests from the user station to output data visualisation software to the user station, and means to authenticate a request by a user in respect of data to be downloaded; and ii) a database accessible by the data retrieval software of said computer system for retrieval and output of data to the user station;

the data visualisation system being arranged such that:

iii) in response to a user input at the user station transmitted to the computer system data visualisation software is downloaded by the computer system to the user station; and iv) in response to an authenticated request by a user in respect of data to be downloaded at the user station, said request being transmitted to the computer system by the downloaded data visualisation software, said data can be selected and retrieved from the database by said data retrieval software and downloaded to said user station for visualisation by use of said downloaded data visualisation software, wherein data downloaded to the user station in response to a user input at the user station transmitted to the computer system by either the downloaded user interface software or the downloaded data visualisation software, relates to a common destination number, or set of numbers, in a communications network, which number or numbers is identified by said user input.

26. A method of providing data visualisation to a remote user station, of data stored in a database in a form which can be queried by a data visualisation software tool, which method comprises:

i) storing the data visualisation software tool in a computer system, ii) receiving a request to the computer system from a remote user station for the tool, iii) authenticating the request and outputting or copying the tool to the user station, iv) receiving a request from the user station for data from the database by means of the tool, v) accessing the database and providing the data to the user station for processing the received data by said tool to provide said data visualisation at the user station, wherein the data comprises communications traffic data in a network.

27. A method as in claim 26 wherein the network to which the data is relevant is used at least in part to transmit the data to the user station and the computer system provides network management of said network.

* * * * *